(12) United States Patent
Chu

(10) Patent No.: US 6,522,891 B1
(45) Date of Patent: Feb. 18, 2003

(54) METHOD OF SINGLE FREQUENCY CHANNEL COMMUNICATION

(75) Inventor: Bang-Foo Chu, Macau (TW)

(73) Assignee: Culture Com. Technology (Macau) Ltd., Macau (TW)

( * ) Notice: Subject to any disclaimer, the term of this patent is extended or adjusted under 35 U.S.C. 154(b) by 0 days.

(21) Appl. No.: 09/426,504

(22) Filed: Oct. 26, 1999

(51) Int. Cl.[7] .............................. H04Q 7/20; H04Q 7/38
(52) U.S. Cl. .................... 455/466; 455/445; 455/422; 455/554; 455/465
(58) Field of Search ................................ 455/466, 445, 455/462, 422, 11.1, 560, 517, 403, 424, 13.1, 524, 525, 436, 426, 554, 465, 415, 416

(56) References Cited

U.S. PATENT DOCUMENTS

| | | | | |
|---|---|---|---|---|
| 4,942,598 A | * | 7/1990 | Davis ........................... | 455/422 |
| 5,890,055 A | * | 3/1999 | Chu et al. ..................... | 455/422 |
| 6,052,557 A | * | 4/2000 | Kinunen et al. ............ | 455/11.1 |
| 6,163,691 A | * | 12/2000 | Buettner et al. ............ | 455/422 |

* cited by examiner

Primary Examiner—William Trost
Assistant Examiner—Keith Ferguson
(74) Attorney, Agent, or Firm—Peter F. Corless; Steven M. Jensen; Edwards & Angell, LLP

(57) ABSTRACT

A method of single frequency channel communication is proposed, for use with a communication system having different communication areas of different area codes, allowing messages or signals to be transmitted between two mobile phones located in the same or different communication areas through transmitting stations without the use of electronic switching systems. A message inputted from a sender mobile phone is denoted with area codes of the sender and receiver, and converted to a signal for being transmitted to a transmitting station where the signal is processed and amplified. For message/signal transmission within a single communication area, such that the sender's and receiver's area codes are identical, the signal received by the transmitting station is directly forwarded to the receiver mobile phone. For message/signal transmission between different communication areas, the received signal is forwarded to another transmitting station in the receiver's area code, and then to the receiver mobile phone.

6 Claims, 4 Drawing Sheets

METHOD OF SINGLE FREQUENCY CHANNEL COMMUNICATION

FIELD OF THE INVENTION

The present invention relates to a method of communication and more particularly, to a method of single frequency channel communication.

DESCRIPTION OF THE RELATED ART

As generally known in the technical field of telecommunication, no matter in a wired or a wireless telecommunication system, when a transmitter in the telecommunication system sends analog or digital signals over a transmission medium or through the air to a receiver of the telecommunication system, an electronic switching system is needed for the telecommunication system to establish a communication channel for both message senders. However, when the working load of an electronic switching system reaches its maximal capability for processing incoming and outgoing signals, telecommunication congestion will thus arise, causing inconvenience to the message senders.

On the other side, cost of the electronic switching system combined with other communication equipment and electronic instruments is so expensive that telephone companies can not increase the electronic switch systems without a limitation. And, without increasing the electronic switching systems, there is still a problem of the communication congestion yet to be solved.

SUMMARY OF THE INVENTION

It is an object of the present invention to provide a method which can be applied to a communication system including mobile phones, and communication transmitting stations without the electronic switching system for message senders to communicate with each other without the telecommunication congestion due to the electronic switching system.

A further object of the present invention is to provide a method which can be applied to a communication system including mobile phones, and communication transmitting stations without the electronic switching system for message senders to input a message including an identification number with an area code of the message sender, an identification number with an area code of the message receiver, and communication information.

A further object of the present invention is to provide a method which can be applied to a communication system including mobile phones, and communication transmitting stations without the electronic switching system, wherein after a communication transmitting station receives a signal from a mobile phone, the signal transmitted from the mobile phone is processed and amplified by the communication transmitting station, and then, the signal is directly transmitted to a mobile phone or to another communication transmitting station for another mobile phone to receive the signal.

A further object of the present invention is to provide a method which can be applied to a communication system including mobile phones, and communication transmitting stations without the electronic switching system, wherein the mobile phones transmit signals including information of an identification number with an area code of the message sender, an identification number with an area code of the message receiver, and communication information.

A further object of the present invention is to provide a method which can be applied to a communication system including mobile phones, and communication transmitting stations without the electronic switching system, wherein mobile phones can receive and process signals transmitted from communication transmitting stations.

Still a further object of the present invention is to provide a method which can be applied to a communication system including mobile phones, and communication transmitting stations without the electronic switching system, wherein a message sender can use a mobile phone to input a message, and the input way can be voice input or characters input.

In accordance with the foregoing and other objectives of this invention, a new method for single frequency channel communication applied to a communication system including mobile phones, and communication transmitting stations without the electronic switching system to avoid communication congestion.

Different areas are divided into different communication areas with different area code, and, then a communication transmitting station is located inside each of communication areas for processing and amplifying signals without using the electronic switching system. Signals can be transmitted and exchanged between communication transmitting stations in different communication areas. There is a certain communication range for each communication transmitting station. For two neighboring communication transmitting stations, a portion of the certain communication range of each communication transmitting station would be overlapped. In the overlapped communication range, a communication transmitting station would process and amplify a signal which has the same area code as that of a communication area in which the communication transmitting station is located. And a communication transmitting station would not process and amplify a signal which has a different area code different from that of the communication area in which the communication transmitting station is located.

A magnitude of a signal transmitted from a mobile phone inside a communication area is just enough for communication transmitting station located in the same communication area to process and amplify the signal. The signal is converted from a message including an identification number with an area code of the message sender, an identification number with an area code of the message receiver, and communication information, and a way of the message input can be voice input or characters input. After being processed and amplified by a communication transmitting station, the signal is directly transmitted from the communication transmitting station to a mobile phone inside the same communication area or transmitted to another communication transmitting station depending on the area code of the message receiver.

When a message sender in a communication area wants to communicate with message receiver by a mobile phone, the message sender can use the mobile phone to input a message including an identification number with an area code of the message sender, an identification number with an area code of the message receiver, and communication information, wherein a way of the message input can be voice input or characters input. And the message is converted into a signal, and then, the signal is transmitted in a single frequency wireless communication way to the communication transmitting station of the communication area where the message sender lives. After the communication transmitting station, which is located in the communication area where the message sender lives, receives the message, the signal is processed and amplified. If the message sender and the message receiver are located in the same communication area, it means that the area code of the message sender and that of the message receiver are the same. And the signal is directly transmitted from the communication transmitting station to the mobile phone of the message receiver. If the message sender and the message receiver are located in different communication areas, it means that the area code of the message sender and that of the message receiver are different. Firstly, the signal is transmitted from the communication transmitting station to another communication transmitting station located in the communication area where the message receivers lives, and then, after the signal is processed and amplified by the another communication transmitting station, the signal is transmitted to the mobile phone of the message receiver. The message receiver can determine whether he would communicate with the message sender. And the message receiver can use the same way to send a message which can be converted into a signal to the message sender. By applying this method, message senders can communicate with one another without communication congestion of the electronic switching system.

Compared with the prior art using the electronic switching systems, the new method has an advantage of eliminating the cost of the electronic switching system combined with other communication equipment and electronic instruments. And the new method in communication system without the electronic switching system can let message senders communicate with each other without communication congestion caused by an overload working of the electronic switching system.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
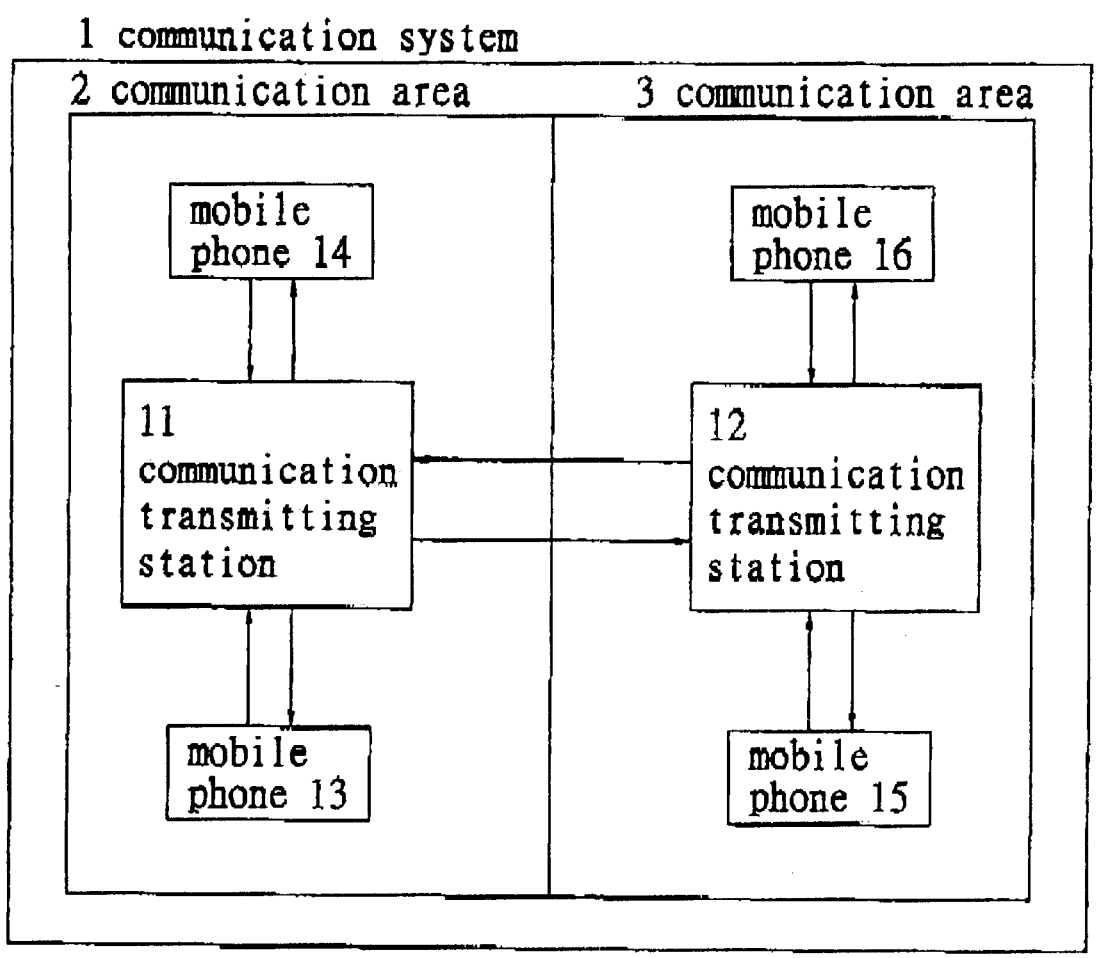
FIG. 1 is a schematic system block diagram showing the hardware architecture of a communication system to which the single frequency channel communication method of the present invention is applied.

FIG. 1 shows a communication system to which the single frequency channel communication method of the present invention is applied. As shown in FIG. 1, the communication system 1 includes two communication transmitting stations 11 and 12, and four mobile phones 13, 14, 15, and 16. There are two different communication area 2 and 3 inside the communication system 1. In the communication area 2, the communication transmitting station 11 can receive, process, and amplify signals transmitted from the mobile phones 13 and 14. And in the communication area 3, the communication transmitting station 12 can receive, process, and amplify signals transmitted from the mobile phones 15 and 16. The communication transmitting stations 11 and 12 can communicate with each other and exchange signals to cover communications between message senders in different communication area 2 and 3.

Different areas are divided into different communication areas 2 and 3 with different area code, and, then a communication transmitting station 11 (12) is located inside a communication area 2 (3) for processing and amplifying signals without using the electronic switching system. Signals can be transmitted and exchanged between communication transmitting station 11 and 12 in different communication area 2 and 3. There is a certain communication range for communication transmitting station 11 and 12. For two neighboring communication transmitting station 11 and 12, a portion of the certain communication range of the communication transmitting station 11 and 12 would be overlapped. In the overlapped communication range, a communication transmitting station 11 or 12 would process and amplify a signal which has the same area code as that of a communication area 2 or 3 in which the communication transmitting station 11 or 12 is located. And a communication transmitting station 11 or 12 would not process and amplify a signal which has a different area code different from that of the communication area 2 or 3 in which the communication transmitting station 11 or 12 is located.

A magnitude of a signal transmitted from a mobile phone 13, or 14 (15, or 16) inside a communication area 2 (3) is just enough for communication transmitting station 11 (12) located in the same communication area 2 (3) to process and amplify the signal. The signal is converted from a message including an identification number with an area code of the message sender, an identification number with an area code of the message receiver, and communication information, and a way of the message input can be voice input or characters input. After being processed and amplified by a communication transmitting station 11 (12), the signal is directly transmitted from the communication transmitting station 11 (12) to a mobile phone 13, or 14 (15 or 16) inside the same communication area 2 (3) or transmitted to another communication transmitting station 12 (11) depending on the area code of the message receiver.

When a message sender in a communication area 2 or 3 wants to communicate with message receiver by a mobile phone 13, 14, 15, or 16, the message sender can use the mobile phone 13, 14, 15, or 16 to input a message including an identification number with an area code of the message sender, an identification number with an area code of the message receiver, and communication information, wherein a way of the message input can be voice input or characters input. And the message is converted into a signal, and then, the signal is transmitted in a single frequency wireless communication way to the communication transmitting station 11 or 12 of the communication area 2 or 3 where the message sender lives. After the communication transmitting station 11 or 12, which is located in the communication area 2 or 3 where the message sender lives, receives the message; the signal is processed and amplified. If the message sender and the message receiver are located in the same communication area 2 (3), it means that the area code of the message sender and that of the message receiver are the same, and the signal is directly transmitted from the communication transmitting station 11 (12) to the mobile phone 13, or 14 of the message receiver. If the message sender and the message receiver are located in different communication area 2 and 3, it means that the area code of the message sender and that of the message receiver are different. Firstly, the signal is transmitted from the communication transmitting station 11 (12) to another communication transmitting station 12 (11) located in the communication area 3 (2) where the message receivers lives, and then, the signal is transmitted to the another communication transmitting station 12 (11), and thereafter, after the signal is processed and amplified by the another communication transmitting station 12 (11), the signal is transmitted to the mobile phone 15 or 16 of the message receiver. The message receiver can determine whether he would communicate with the message sender. And the message receiver can use the same way to send a message which can be converted into a signal to the message sender. By applying this method, message senders can communicate with one another without communication congestion of electronic switching system.

Figure 2:
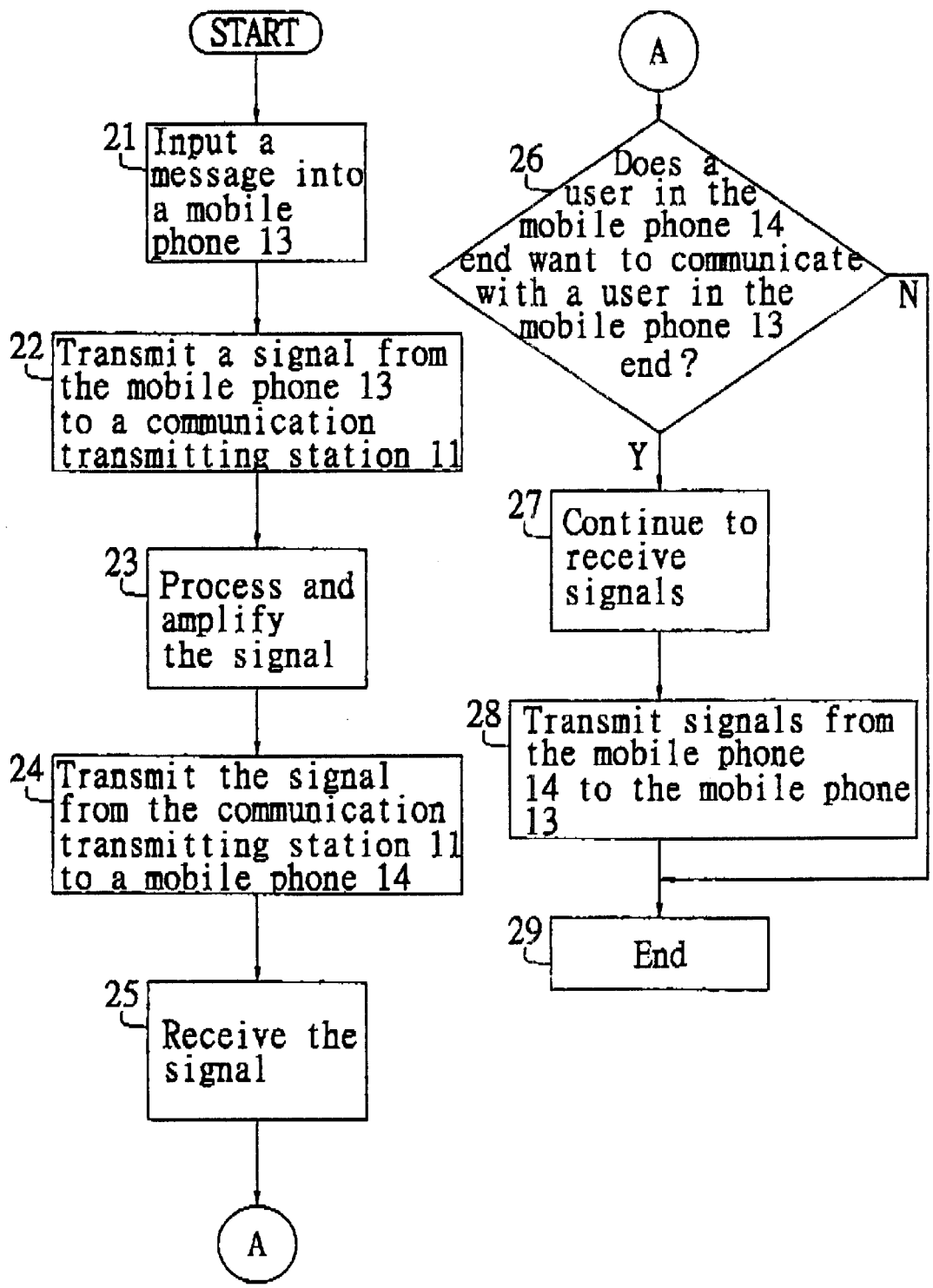
FIG. 2 is a flow chart of an embodiment of the system shown in FIG. 1 to illustrate steps for communication between two message senders in the same communication area in accordance with the single frequency channel communication method of the present invention.

FIG. 2 is a flow chart of an embodiment of the system shown in FIG. 1 to illustrate steps for communication between two message senders in the same communication area in accordance with the single frequency channel communication method of the present invention. According to an area code of the message sender and that of the message receiver are the same, it means that the both message senders are in the same communication area 2 (3), so a communication transmitting station 11 (12) would receive a signal transmitted from a mobile phone 13 or 14 (15 or 16) of the sender, and then, directly transmit the signal to a mobile phone 14 or 13 of the message receiver. In block 21, when the message sender with the mobile phone 13 wants to communicate with the message receiver with the mobile phone 14, the message sender (message sender) with mobile phone 13 would input a message including an identification number with an area code of the message sender, an identification number with an area code of the message receiver, and communication information into the mobile phone 13, wherein the input way can be voice input or characters input. In block 22, the message is converted into a signal and transmitted to the communication transmitting station 11 in a single frequency wireless communication way. The process continues on to block 23 where the communication transmitting station 11 without the electronic switching system would process and amplify the signal after the signal received by the communication transmitting station 11. In block 24, the communication transmitting station 11 would transmit the signal to the mobile phone 14 of the message receiver (message receiver), and the process continues on to block 25. In block 25, the mobile phone 14 receives the signal, and the process continues on to block 26. In block 26, the message receiver with the mobile phone 14 would determine if he wants to communicate with the message sender with the mobile phone 13. If the message receiver having the mobile phone 14 wants to communicate with the message sender having the mobile phone 13, the process continues on to block 27. If the message receiver does not want to communicate with the message sender, the process skips to block 29. In block 27, the message receiver would continue receiving signals representing messages from the message sender through the communication transmitting station 11, and the process continues on to block 28. In block 28, the message receiver can use the same way used by the message sender to send messages including an identification number with an area code of the message sender, an identification number with an area code of the message receiver, and communication information to the original message sender for communicating with each other through the communication transmitting station 11, and the process continues on to block 29. In block 29, both message senders end the communication process.

Figure 3:
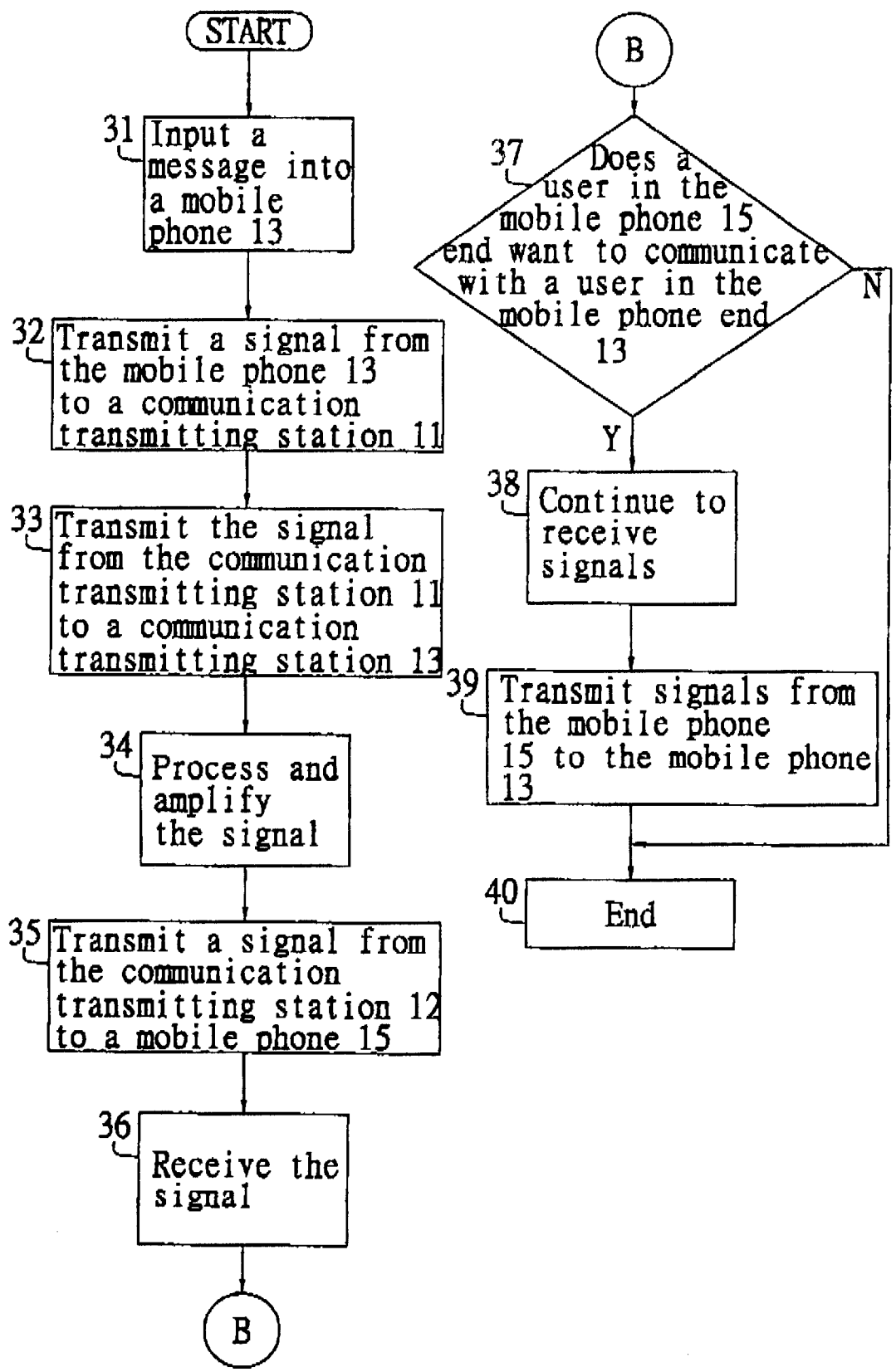
FIG. 3 is a flow chart of an embodiment of the system shown in FIG. 1 to illustrate steps for communication between two message senders in different communication areas in accordance with the single frequency channel communication method of the present invention.

FIG. 3 is a flow chart of an embodiment of the system shown in FIG. 1 to illustrate steps for communication between two message senders in different communication areas in accordance with the single frequency channel communication method of the present invention. According to an area code of the message sender and that of the message receiver are different, it means that the both message senders are in different communication areas, so a communication transmitting station would receive a signal transmitted from a mobile phone of the message sender, and then, the communication transmitting station would send the signal to another transmitting station, and thereafter, after the another communication transmitting station receives the signal, the another communication transmitting station would transmit the signal to a mobile phone of the message receiver. Firstly, in block 31, when the message sender having the mobile phone 13 wants to communicate with the message sender having the mobile phone 15, the message sender having the mobile phone 13 would input a message including an identification number with an area code of the message sender having the mobile phone 13, an identification number with an area code of the message receiver having the mobile phone 15, and communication information into the mobile phone 13, wherein the input way can be voice input or characters input, and the process continues on to block 32. In block 32, the message is converted into a signal and transmitted to the communication transmitting station 11 in a single frequency wireless communication way. The process continues on to block 33 where the communication transmitting station 11 without the electronic switching system would process and amplify the signal after the signal received by the communication transmitting station 11, but according to the area code of the message sender and that of the message receiver are different, the communication transmitting station 11 would transmit the signal to the communication transmitting station 12, and the process continues on to block 34. In block 34, the communication transmitting station 12 without the electronic switching system would process and amplify the signal transmitted from the communication transmitting station 11, and the process continues on to block 35. In block 35, the communication transmitting station 12 would transmit the signal to the message receiver having the mobile phone 15, and the process continues on to block 36. In block 36, the mobile phone 15 receives the signal, and the process continues on to block 37, the message receiver having the mobile phone 15 would determine if he wants to communicate with the message sender having the mobile phone 13. If the message receiver wants to communicate with the message sender, the process continues on to block 38. If the message receiver does not want to communicate with the message sender, the process skips on to block 40. In block 38, the message receiver would continue receiving signals representing messages from the message sender through the communication transmitting station 11 and 12, and the process continues on to block 39. In block 39, the message receiver can use the same way used by the message sender to send messages including an identification number with an area code of the message sender, an identification number with an area code of the message receiver, and communication information to the original message sender for communicating with each other through the communication transmitting station 11 and 12, and the process continues on to block 40. In block 40, both message senders end the communication process.

Figure 4:
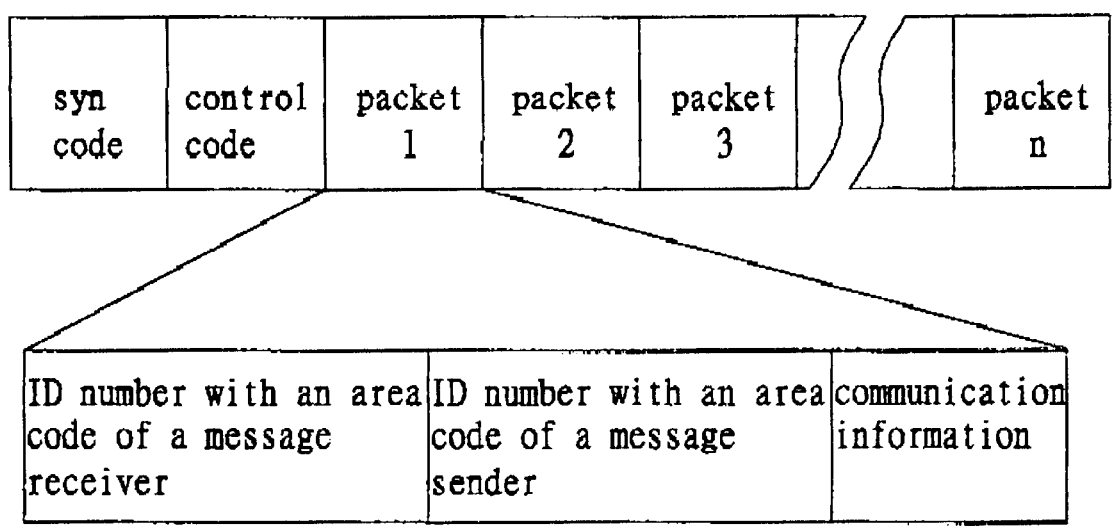
FIG. 4 illustrates a message which is inputted by a message sender and includes synchronization code, control code, different packets, wherein each packet has an identification number with an area code of the message sender, an identification number with an area code of the message receiver, and communication information.

FIG. 4 illustrates a message which is inputted by a message sender and includes synchronization code, control code, and different packets, wherein each packet has an identification number with an area code of the message sender, an identification number with an area code of the message receiver, and communication information. As shown in the FIG. 4, a message would include synchronization code, control code, and different packets, wherein each packet has an identification number with an area code of the message sender, an identification number with an area code of the message receiver, and communication information. The area code is used for determining whether the message sender and the message receiver are in the same communication area. If the area code of the message sender and that of the message receiver are different, at least two communication transmitting stations would be needed to let the both message senders communicate with each other. But if the area code of the message sender and that of the message receiver are the same, a communication transmitting station located in a communication area where both message senders live would be utilized to process the communications between those two message senders. The synchronization code, and the control code are used for ensuring that signals can be actually received and transmitted by message senders in communications.

The present invention has been described hitherto with exemplary preferred embodiments. However, it is to be understood that the scope of the present invention need not be limited to the disclosed preferred embodiments. On the contrary, it is intended to cover various modifications and similar arrangements with the scope defined in the following appended claims. The scope of the claims should be accorded the broadest interpretation so as to encompass all such modifications and similar arrangements.

What is claimed is:

1. A communication method using a single frequency channel for a communication system, which includes mobile phones and communication transmitting stations without the use of an electronic switching system for communications between message senders, the method comprising the steps of:

(a) inputting a message including an identification number with an area code of a message sender, an identification number with an area code of a message receiver, and communication information into a mobile phone by the message sender while the message sender wants to communicate with the message receiver;

(b) transmitting a signal converted from the message to a communication transmitting station through the mobile phone by the message sender in a single frequency wireless communication way;

(c) after the communication transmitting station receives the signal, processing and amplifying the signal, and then, transmitting the signal to a mobile phone of the message receiver in the same communication area having the same area code;

(d) receiving and processing the signal by the mobile phone of the message receiver in the same communication area;

(e) after the signal is received and processed by the mobile phone of the message receiver, determining by the message receiver whether to receive signals from the message sender;

(f) if yes, receiving signals from the message sender to communicate with the message sender; if no, going to step (c); and (g) ending the communication process.

2. The method of claim 1, wherein in the step (a), the message is inputted by voice into the mobile phone of the message sender.

3. The method of claim 1, wherein in the step (a), the message is inputted by characters into the mobile phone of the message sender.

4. A communication method using a single frequency channel for a communication system, which includes mobile phones and communication transmitting stations without the use of an electronic switching system for communications between message senders, the method comprising the steps of:

(a) inputting a message including an identification number with an area code of a message sender, an identification number with an area code of a message receiver, and communication information into a mobile phone by the message sender while the message sender wants to communicate with the message receiver;

(b) transmitting a signal converted from the message to a communication transmitting station through the mobile phone by the message sender in a single frequency wireless communication way;

(c) after the communication transmitting station receives the signal, processing and amplifying the signal, and then, transmitting the signal to another communication transmitting station located in a different communication area having a different area code;

(d) after the another communication transmitting station receives the signal, processing and amplifying the signal, and then, transmitting the signal to a mobile phone of the message receiver in the same communication area where the another communication transmitting station is located;

(e) receiving and processing the signal by the mobile phone of the message receiver in the same communication area where the another communication transmitting station is located;

(f) after the signal is received and processed by the mobile phone of the message receiver, determining by the message receiver whether to receive signals from the message sender;

(g) if yes, receiving signals from the message sender to communicate with the message sender; if no, going to step (e); and (h) ending the communication process.

5. The method of claim 4, wherein in the step (a), the message is inputted by voice into the mobile phone of the message sender.

6. The method of claim 4, wherein in the step (a), the message is inputted by characters into the mobile phone of the message sender.

* * * * *